United States Patent
Pfister et al.

[19]

[11] Patent Number: 6,164,554

[45] Date of Patent: Dec. 26, 2000

[54] PRESSURE ATOMIZING TYPE BURNER FOR AN ENGINE INDEPENDENT HEATING SYSTEM IN A VEHICLE

[75] Inventors: Wolfgang Pfister, Esslingen; Hans-Jürgen Schmid, Ludiwgsburg; Heinrich Wacker, Weilheim; Adolf Schodt, Esslingen; Dieter Götz, Kirchheim; Günther Eberspach, Wolfschlugen, all of Germany

[73] Assignee: J. Eberspächer GmbH & Co., Germany

[21] Appl. No.: 09/297,531

[22] PCT Filed: Oct. 23, 1997

[86] PCT No.: PCT/DE97/02493

§ 371 Date: Apr. 30, 1999

§ 102(e) Date: Apr. 30, 1999

[87] PCT Pub. No.: WO98/20281

PCT Pub. Date: May 14, 1998

[30] Foreign Application Priority Data

Nov. 2, 1996 [DE] Germany .......................... 196 45 180

[51] Int. Cl.[7] ................................................. B60H 1/02
[52] U.S. Cl. .......................... 237/12.3 C; 431/73
[58] Field of Search .................... 237/12.3 C, 12.3 R; 431/73, 259, 28

[56] References Cited

U.S. PATENT DOCUMENTS

| | | |
|---|---|---|
| 4,391,580 | 7/1983 | Hunsberger . |
| 4,946,097 | 8/1990 | Kawamura ............................... 237/2 A |
| 4,984,736 | 1/1991 | Reiser et al. ............................ 237/2 A |
| 5,350,114 | 9/1994 | Nelson et al. ........................... 237/2 A |
| 5,366,151 | 11/1994 | King et al. ............................. 237/2 A |
| 5,413,279 | 5/1995 | Quaas et al. ....................... 237/12.3 C |
| 5,456,408 | 10/1995 | Appel ...................................... 237/2 A |
| 5,480,093 | 1/1996 | Tochizawa et al. ............... 237/12.3 C |
| 5,617,995 | 4/1997 | Yasuda et al. ..................... 237/12.3 C |
| 5,927,269 | 7/1999 | Quarrie .................................... 126/355 |

FOREIGN PATENT DOCUMENTS

| | | |
|---|---|---|
| 0 349 737 | 1/1990 | European Pat. Off. . |
| 2 202 581 | 5/1974 | France . |
| 3636647 | 5/1988 | Germany . |
| 4329955 | 3/1995 | Germany . |
| 59188064 | 10/1984 | Japan . |

*Primary Examiner*—Harold Joyce
*Assistant Examiner*—Derek S. Boles
*Attorney, Agent, or Firm*—McGlew and Tuttle, P.C.

[57] ABSTRACT

The present invention pertains to a present atomizing type burner (1) for an engine independent heating system in a vehicle, comprising a pump (2) for feeding liquid fuel (4) through the fuel pipe (5) to the spray nozzle (3), a ventilator (6) for feeding combustion air (7) to the combustion chamber, an electric motor (9) for driving both the fuel pump (2) and the ventilator (6), and an igniting device (10) for firing the air-fuel mixture in the combustion chamber (8). The invention suggests that the system be fitted with a voltage and speed regulator (11) for the electric motor (9), as well as a device for regulating the fuel pump (2) pressure after the heating system has ignited and the flame has become stable.

14 Claims, 5 Drawing Sheets

PRESSURE ATOMIZING TYPE BURNER FOR AN ENGINE INDEPENDENT HEATING SYSTEM IN A VEHICLE

FIELD OF THE INVENTION

The present invention pertains to a pressure atomization burner for an engine-independent vehicle heater, with a fuel pump, by which liquid fuel can be fed to the atomization nozzle from a fuel line; with a blower, by which combustion air can be delivered into the interior of the combustion chamber; with an electric motor, by which both the fuel pump and the blower are driven; and with an igniting means for igniting the fuel-air mixture in the interior of the combustion chamber.

BACKGROUND OF THE INVENTION

Pressure atomization burners of the above-described type are operated according to the state of the art at one output stage, wherein the mean heat output can be varied by varying the on time. For heating up rapidly, it is necessary to design the device for a high burner output. However, only small amounts of energy are needed to keep the device warm. However, if the on time is shorter than the minimum combustion time, trouble-free operation of the burner is no longer possible. The consequence of this is combustion generating large amounts of pollutants with deposits in the flame tube or in the heater. Pressure atomization burners operated with a one-stage output for vehicle parking heaters have been known, e.g., from DE 195 34 866 A1 or DE 35 36 143 C2. If the burner is to be operated at another output, the atomization nozzle and the drive motor are replaced with correspondingly different units.

SUMMARY AND OBJECTS OF THE INVENTION

Based on the above-described state of the art, the object of the present invention is to provide a pressure atomization burner of the type described in the introduction, which makes do with a single atomizer nozzle and a single drive motor and can be operated equally efficiently and reliably in different ranges.

According to the invention, a pressure atomization burner is provided for an engine-independent vehicle heater. The burner has a fuel pump, by which liquid fuel is fed to an atomizing nozzle via a fuel line. The burner has a blower by which combustion air can be delivered into the interior of a combustion chamber. The burner has an electric motor, by which both the fuel pump and said blower are driven. An igniting means is provided for igniting the fuel-air mixture in the interior of the combustion chamber. A control device is provided for a voltage or speed control of the electric motor as well as for a pressure control of the fuel pump after the conclusion of the phase of ignition of the heater with the formation of a stable flame.

The essence of the present invention is that the pressure atomization burner of an engine-independent vehicle heater is designed with a control device for a voltage or speed control of the electric motor as well as with a pressure control of the fuel pump after the end of the phase of ignition of the heater.

The voltage or speed control of the electric motor as well as the pressure control of the fuel pump are advantageously performed in stages.

In particular, the number of voltage or speed control stages may be equal to the number of the pressure control stages of the fuel pump.

An especially simple and equally efficient and reliable variant of the present invention has two output stages of a control, namely, a low output stage and a high output stage.

Two adjustable pressure-limiting valves with a reversible solenoid valve arranged downstream in the fuel return may be arranged in parallel to one another in the fuel line between the fuel pump and the atomizing nozzle in a pressure atomization burner.

The fuel return may be connected on the suction side of the fuel pump. The pressure atomization burner is controlled in this case in a closed one-line operation.

However, the fuel return may also be led to the fuel reserve and contain a third pressure-limiting valve opening toward the suction side of the fuel pump. The pressure atomization burner is controlled in an open two-line operation in this case.

Instead of the two adjustable pressure-limiting valves and the reversible solenoid valve arranged downstream, an adjustable pressure control valve in the form of an adjustable fourth pressure-limiting valve with an upstream throttle or with a downstream throttle in the fuel return may also be provided in the fuel line between the fuel pump and the atomization nozzle.

As an alternative, the throttle and the adjustable fourth pressure-limiting valve may also be arranged in parallel to one another in the fuel line between the pump and the nozzle.

In an especially advantageous embodiment, the throttle is designed as an adjustable throttle.

A closed one-line control operation due to the connection of the fuel return on the suction side of the fuel pump or an open two-line control operation due to the connection of the fuel return to the fuel reserve with a third pressure-limiting valve opening toward the suction side of the fuel pump is likewise possible in the above-mentioned design variants.

An especially favorable embodiment is obtained if the adjustable throttle is designed as a throttle integrated within a hollow screw, wherein the hollow screw is arranged in a burner housing hole of the fuel return.

The adjustable throttle may have a conical final control element sealed by an O-ring seal in the fuel return.

A shut-off valve, preferably a shut-off valve that can be actuated magnetically, is preferably located in the fuel line directly before the atomizing nozzle.

A process for controlling a pressure atomization burner of a motor vehicle heater after start-up after the conclusion of the phase of ignition, i.e., after the formation of a stable burner flame, is characterized, in particular, in that the control device switches on the low output stage of the heater at the switch-on criterion, i.e., after conclusion of the phase of ignition, and evaluates a temperature signal of the heat exchanger water of the heater, wherein the high output stage of the heater is switched on in the case of a water temperature that is too low relative to a defined temperature limit value, i.e., at a first switchover criterion, until the water temperature reaches the defined temperature limit value, i.e., a second switchover criterion for the low output stage, and it switches again over to the low output stage until the switch-off criterion of the control is reached, or the low output stage of the heater is continued in the case of a water temperature that is too high relative to the defined temperature limit value until the switch-off criterion of the control device is reached.

Consequently, the present invention provides a pressure atomization burner whose output is controllable in stages or continuously, wherein a two-stage output control is provided, in particular, by which a higher output is set up for heating and a low output for keeping the device warm, so that the heat output can be adjusted to the demand and favorable burning times are also obtained in the warm-holding operation. A single two-stage output-controlled heater according to the present invention can thus replace three prior-art heaters with different (single-stage) output. For example, a two-stage control device of 24 kW and 35 kW may be provided. The pressure atomization burner is preferably used in large water heaters.

The operating point of the amount of air is set by a voltage-controlled electric motor.

The motor drives at the same time the fuel pump, which in turn has two or more pressure-limiting valves, which are set at different pressure levels.

The amount of fuel is atomized by means of a single atomizing nozzle, independently from the operating point. The amount of fuel depends on the pressure level occurring.

As an alternative to a two-stage or more than two-stage pressure controller or pressure limiter, the fuel supply characteristic can be adjusted to the combustion air characteristic as a function of the speed by means of a suitable pressure control valve.

As an alternative to the voltage-controlled motor, it is possible to use a speed-controlled motor.

In the case of the voltage control of the motor, which takes place internally in the control device, the voltage on the terminal contacts of the burner motor is adjusted to a constant value independently from the voltage of the supply system. This value may assume different levels. If a defined voltage is applied to the burner motor, a speed which is influenced by the electric design of the motor, its friction conditions, the drive torque of the fuel pump and the blower back pressure (drive torque of the blower) becomes established. All these parameters may show slight dispersions from one example of the pressure atomization burner to the next. This affects the resulting speed. In the case of a voltage-controlled motor, which drives the blower wheel and the fuel pump synchronously, the speed stages of the motor and, associated with this, corresponding amounts of air consequently become established corresponding to the number of voltage stages. A voltage-controlled burner motor has the advantage that external components are not needed. The voltage control takes place exclusively in the control device.

In the case of speed control of a motor, which requires an engine speed sensor and electric connections on the control device in terms of hardware, the voltage on the terminal contacts of the burner motor is selected independently from the voltage of the supply system such that a preset speed set point will be maintained as accurately as possible. External effects, such as friction conditions, the drive torque of the fuel pump or the blower back pressure (drive torque of the blower), can thus no longer affect the speed of the burner motor.

A stepwise output control may take place on the basis of a plurality of controlled voltage values with actuation of the corresponding pressure-limiting valve or, as an alternative, on the basis of a plurality of speed-controlled working points, likewise with actuation of the corresponding pressure-limiting valve.

The speed control in discrete working points offers the advantage over voltage control that the tolerances in the amount of air and thus the dispersion of the lambda value of the combustion can be maintained within narrower ranges.

The maximum possible output control range with a single pressure atomization nozzle is between 1:1.5 and 1:2.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENT

Figure 1:
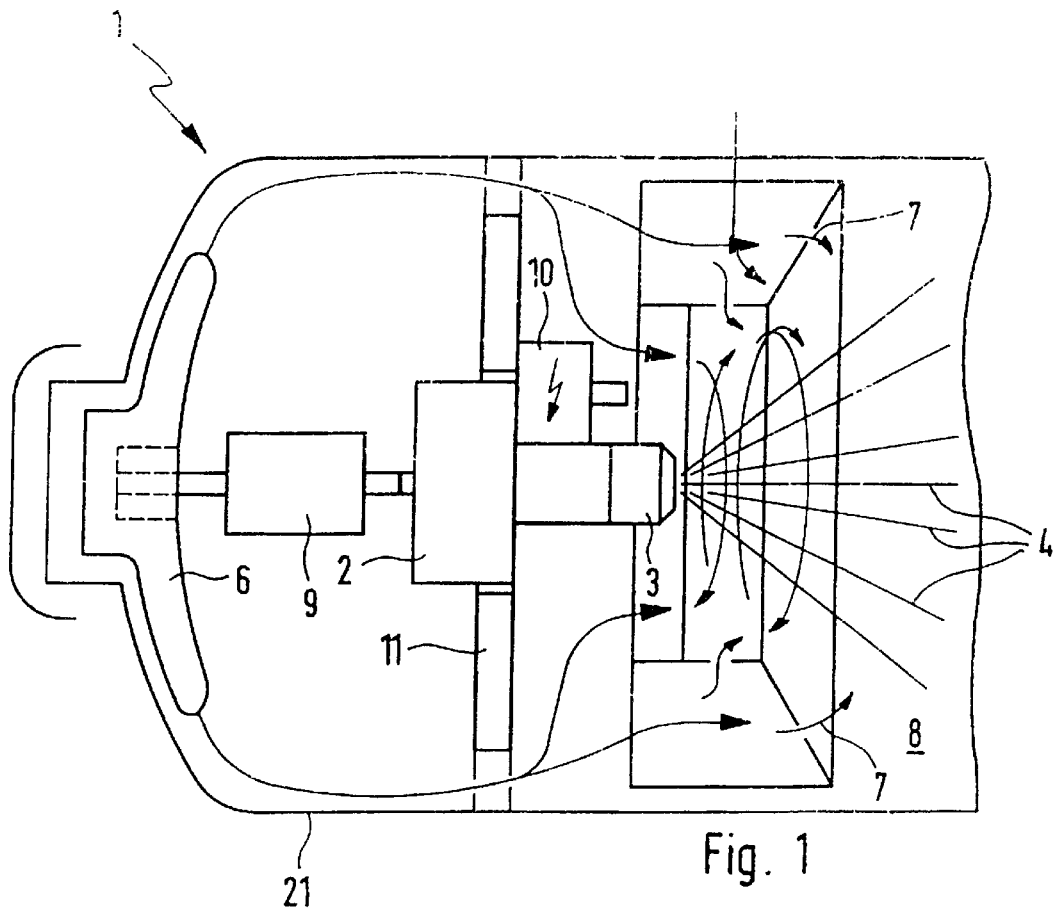
FIG. 1 is a schematic axial sectional view of an output-controlled pressure atomization burner with a control device for the electric motor and the fuel pump.

Referring to the drawings in particular, FIG. 1 schematically shows an output-controlled pressure atomization burner 1 for an engine-independent vehicle heater.

The electric motor 9 synchronously drives both a blower 6 and a fuel pump 2. The fuel pump 2 is a gear pump with a gear assembly, which is integrated within a radial support plate of the burner housing 21.

The support plate is also used to fasten a control device 11 for the voltage control U of the electric motor 9 as well as a pressure control p of the fuel pump 2, as will be specifically described below.

Liquid fuel 4 is fed by the pressure-controlled fuel pump 2 to an atomization nozzle 3 via a fuel line 5, which will be described below, and it is injected from there into the interior 8 of the combustion chamber under a controlled pressure.

Corresponding to the controlled fuel pressure p, a defined amount of fuel $\dot{v}$ Br is introduced into the interior of the combustion chamber.

Corresponding to the speed of the blower that becomes established, a defined amount v̇ L of combustion air 7 is delivered by the voltage-controlled blower 6 or the voltage-controlled electric motor 9 into the interior 8 of the combustion chamber, where the air mixes with the injected fuel, and the fuel-air mixture is ignited by an igniting means 10.

Figure 6:
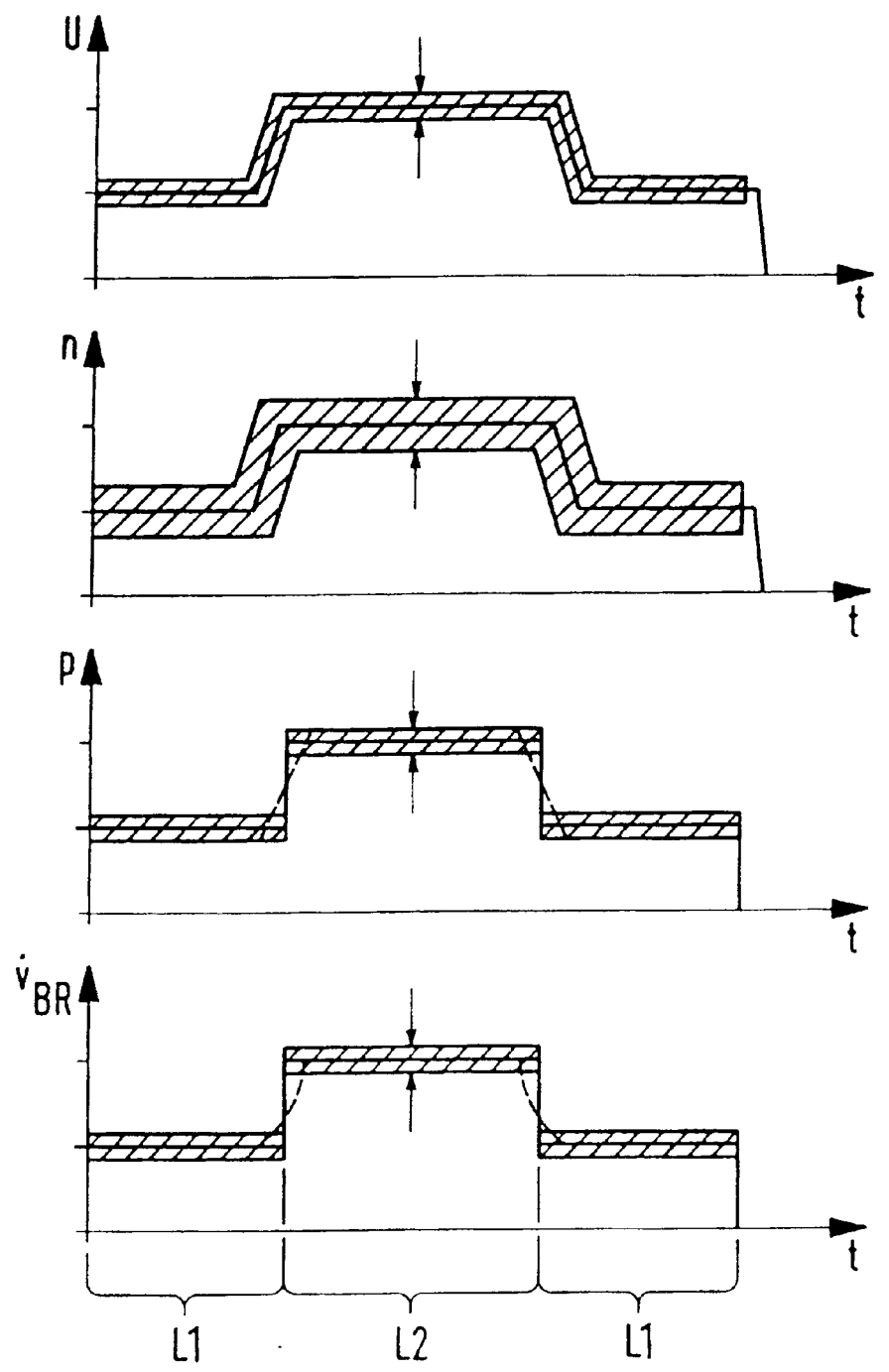
FIG. 6 is a schematic diagrammatic view showing characteristics of a two-stage control device as a function of the time, namely, a voltage control and a speed control of an electric motor, as well as a pressure control and consequently a fuel supply control of a fuel pump.

The pressure atomization burner 1 is controlled, especially according to FIG. 6, in two stages by means of the control device 11: A low output stage L1 and a high output stage L2 of a heater, which is provided with an aforementioned pressure atomization burner 1 and has a water heat exchanger, are set up, in principle. Depending on the heat demand, one output stage or the other is put into operation after the stabilization of the flame. At the high output stage L2 of, e.g., 35 kW, the water of the heater is heated up after the conclusion of the phase of ignition with the formation of a stable flame. In the low output stage L1 of, e.g., 24 kW, the heater is kept warm. The switchover takes place based on fixed temperature limit values TG of the warm water, which is present in the heat exchanger of the heater.

As is apparent from FIG. 6, speed control n of the electric motor 9 is also shown next to the voltage control U of the electric motor. All four characteristics of the controlled variables U, n, p and v̇ Br shown are within a shaded tolerance range.

Figure 2:
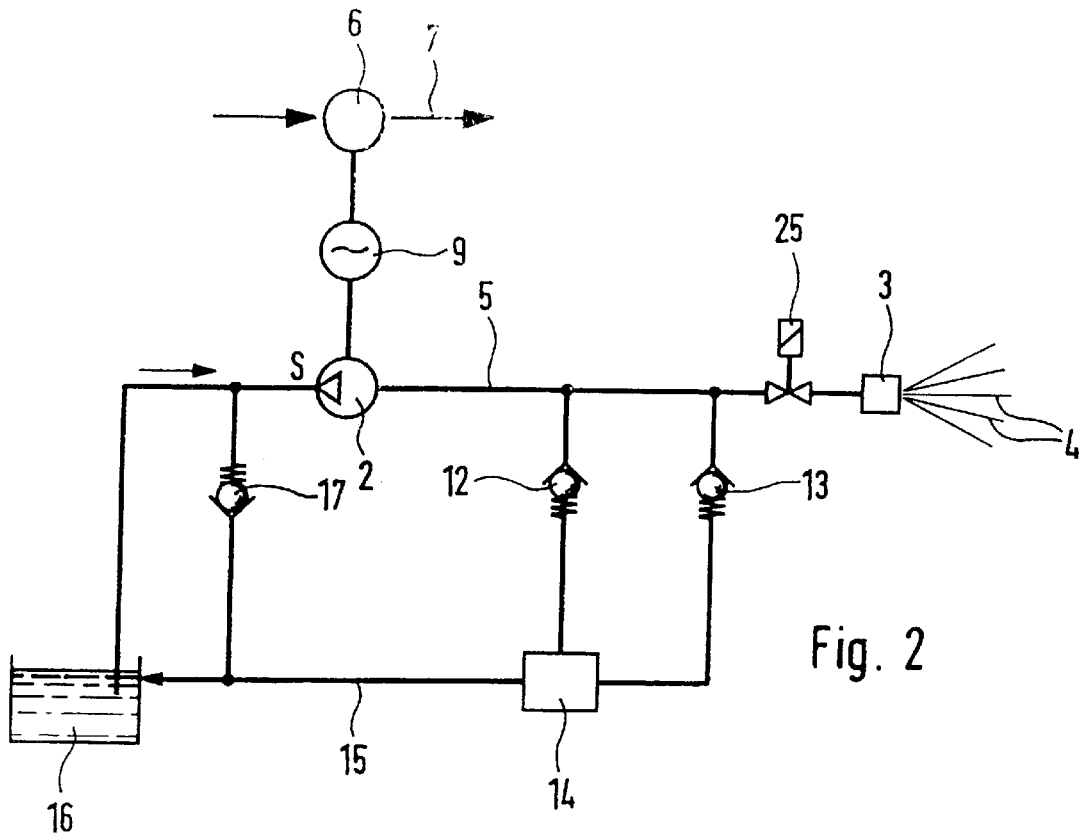
FIG. 2 is a schematic diagram showing an arrangement of a control device with a voltage-controlled electric motor and with a pressure-controlled fuel pump, wherein two reversible pressure-limiting valves are provided.

FIG. 2 shows a variant of a two-stage control by means of pressure-limiting valves, wherein two adjustable pressure-limiting valves 12, 13 with a downstream, reversible solenoid valve 14 in the fuel return 15 are provided in parallel to one another in the fuel line 5 between the fuel pump 2 and the atomizing nozzle 3. The pressure levels of the first pressure-limiting valve 12 and of the second pressure-limiting valve 13 are set by the pretension of the spring and are nearly independent from the volume flow being delivered. The fuel return 15 to the fuel reserve 16 contains a third pressure-limiting valve 17 opening toward the suction side S of the fuel pump 2 or a pressure relief valve. The fuel control is performed in an open two-line operation. A shut-off valve 25, which can be actuated magnetically, is located in the fuel line 5 directly before the atomizing nozzle 3.

For a closed one-line control of the fuel being fed in, the fuel return 15 may also be connected on the suction side S of the fuel pump 2, without a pressureless fuel supply tank being present, or the additional integration of an existing storage tank within the control system may be omitted.

Figure 3:
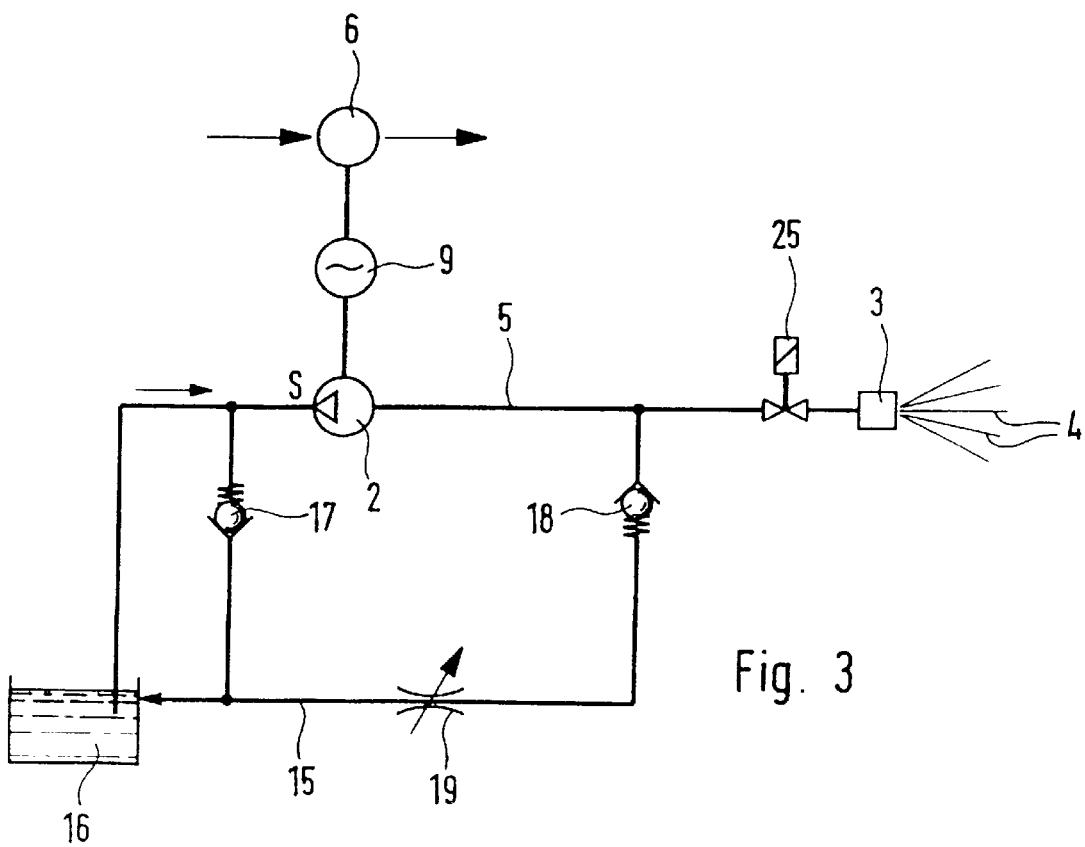
FIG. 3 is a schematic diagram showing an arrangement of another control device similar to that shown in FIG. 2, with a fourth pressure-limiting valve and with an adjustable, downstream throttle connected in series.
Figure 7:
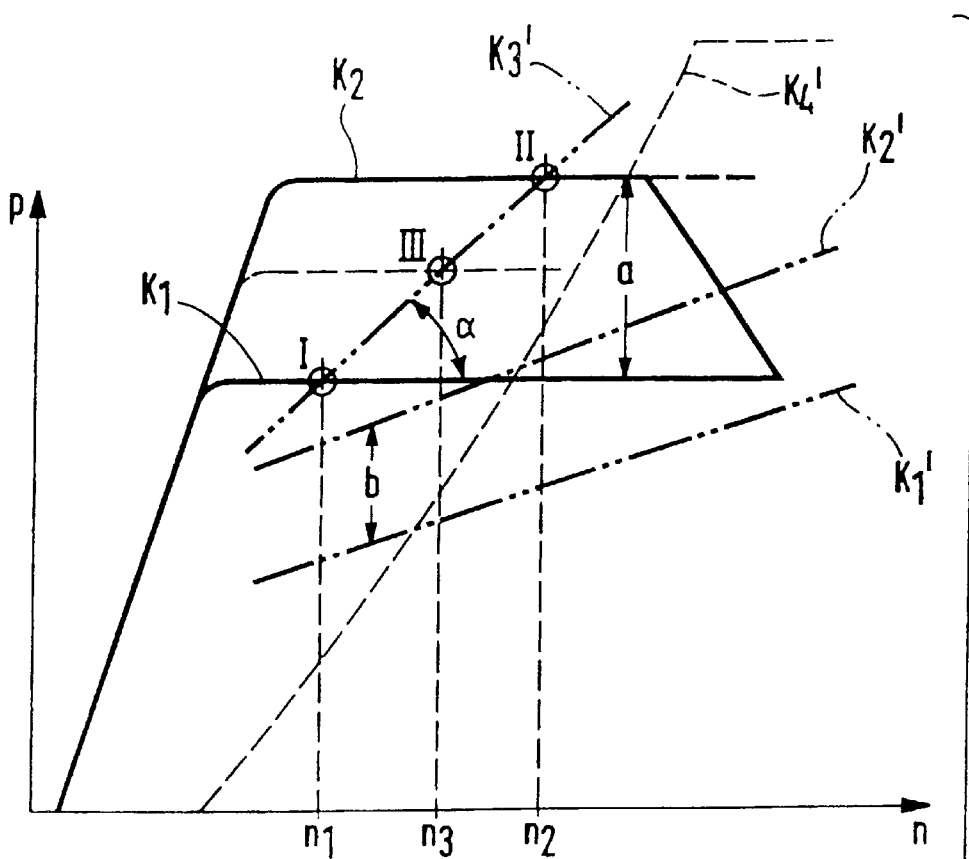
FIG. 7 is a schematic diagrammatic view showing characteristics of the control arrangements according to FIGS. 2 and 3, wherein the fuel pressure of the fuel pump and the amount of combustion air supplied by the blower are plotted as a function of the speed of the electric motor.
Figure 7:
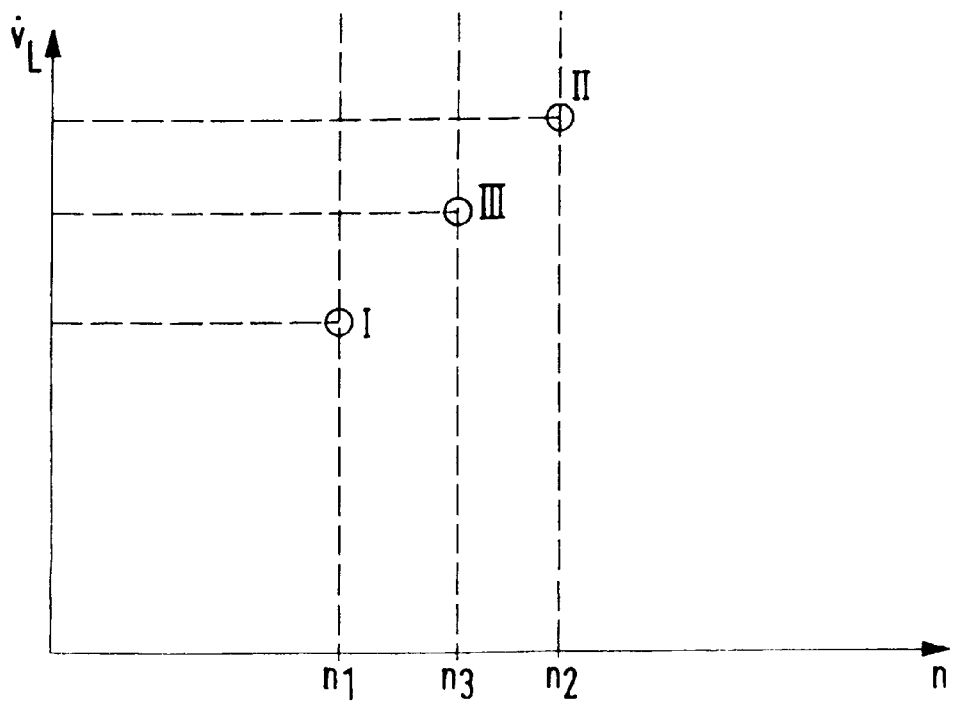

The control variant of a pressure atomization burner 1, which is shown in FIG. 3, has, in the fuel line 5 between the fuel pump 2 and the atomizing nozzle 3, an adjustable pressure control valve in the form of an adjustable, fourth pressure-limiting valve 18 with a throttle 19 arranged downstream in the fuel return 15, the said throttle 19 being adjustable. The throttle 19 and the pressure-limiting valve 18 are arranged in series, from which arises the function of a pressure control valve. The pressure characteristic can thus be modulated as a function of the amount delivered. Reference is made in this connection to FIG. 7, especially K1', K2' and K3'. The difference between K2' and K3' is that the diameter of the throttle 19 has been modified.

As according to FIG. 2, this embodiment variant also has an open two-line control operation, wherein the fuel return 15 to the fuel reserve 16 has a pressure relief valve in the form of a third pressure-limiting valve 17, which opens toward the suction side S of the fuel pump 2. However, the above-mentioned closed one-line operation of a fuel control may also be provided as an alternative. The atomizing nozzle 3 also has a shut-off valve 25 in the form of a solenoid valve.

For example, two different pressure levels corresponding to the distance b according to FIG. 7 can be set by means of the adjustable pressure control valve, so that the speed-dependent pressure characteristics K1' and K2' are obtained. The characteristics K1' and K2' have a slope which is characterized by the throttle 19. Since the throttle is adjustable, the slope α can be varied, so that, e.g., the characteristic K3 with the working points I, III, and III of a fuel control according to the top part of FIG. 7 will be obtained. The pressure curve with an adjustable, fourth pressure-limiting valve 18 and a throttle 19 according to the embodiment variant shown in FIG. 3 is shown in FIG. 6 by a broken line.

With the throttle absent, corresponding to the embodiment variant according to FIG. 2, the (horizontal) characteristics K1 and K2 with the distance a, which characterize the two-stage nature of the control, are obtained, e.g., with two adjustable pressure-limiting valves 12, 13.

As can be determined from the bottom part of FIG. 7, the working points I, III and II of a blower 6 and corresponding amounts of combustion air supplied, v̇ L, are obtained, because the blower 6 and the fuel pump 2 are operated synchronously at the common speed n1, n3 or n2, and the speed n of the electric motor 9 can be varied by the voltage control or by a speed control proper.

Consequently, if a pressure control valve is used according to FIG. 3 instead of the two or three pressure controllers or pressure limiters, which maintain the nozzle pressures at a defined, adjustable level independently from the pump speed, the nozzle pressure can be varied as a function of the pump speed. The pump and the blower are driven by the same motor, i.e., more combustion air is delivered with increasing motor speed and more fuel is injected corresponding to the pressure control characteristic. Finally, a continuous burner output control can be embodied for a pressure atomization burner by an appropriate coordination of the air and fuel.

Figure 4:
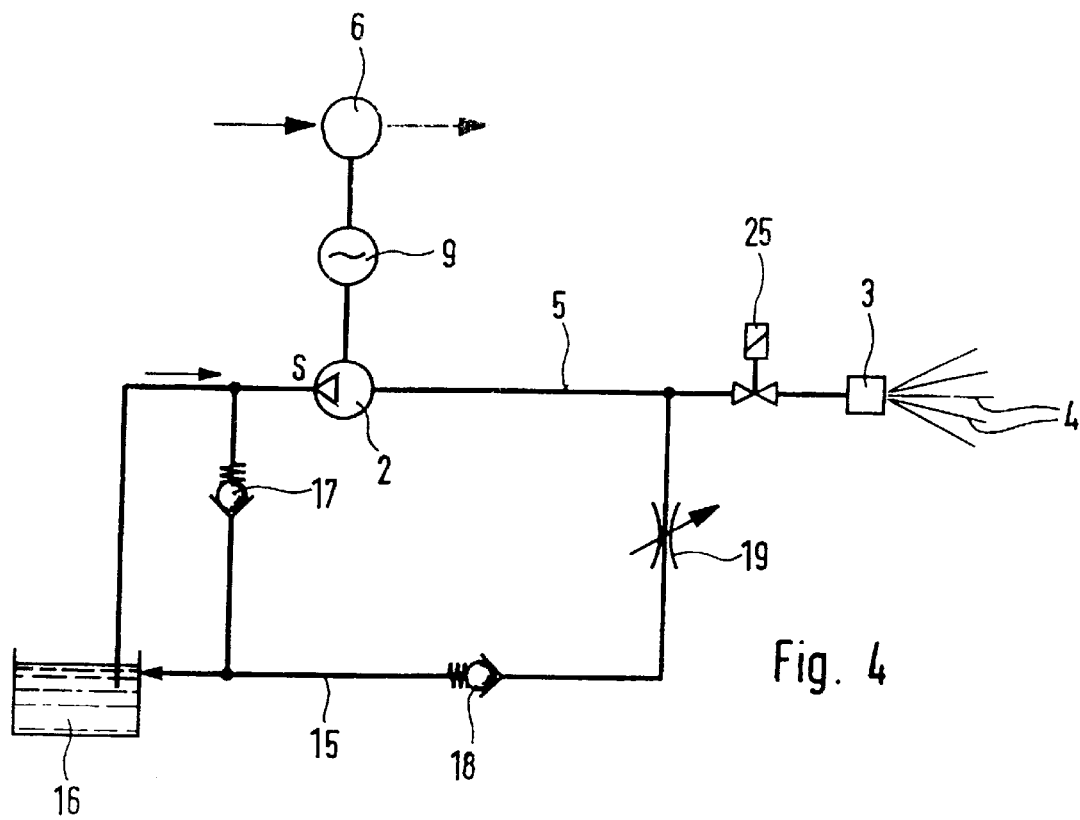
FIG. 4 is a schematic diagram showing an arrangement similar to that shown in FIG. 3, wherein the throttle is located before the fourth pressure-limiting valve.

The embodiment shown in FIG. 4 corresponds essentially to that in FIG. 3. Only the order in which the throttle 19 and the fourth pressure-limiting valve 18 are arranged is transposed. Thus, the function of the variable (or fixed) throttle 19 does not affect the pressure-limiting valve 18.

Figure 5:
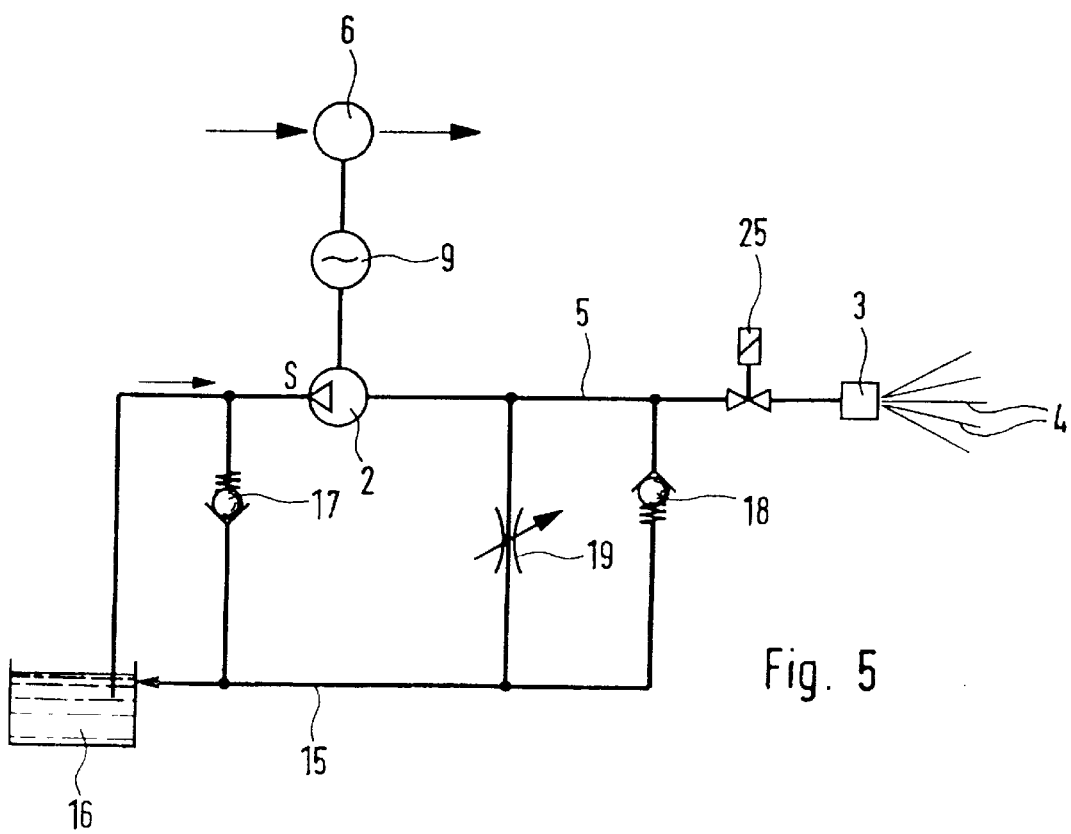
FIG. 5 is a schematic diagram showing an arrangement similar to that shown in FIGS. 3 and 4, wherein the throttle and the fourth pressure-limiting valve are arranged in parallel to one another in the fuel line.

The circuit variant shown in FIG. 5 corresponds basically to that according to FIGS. 3 and 4. However, the variable (or fixed) throttle 19 and the fourth pressure-limiting valve 18 are connected in parallel to one another. The pressure characteristic K4' according to FIG. 7 is thus obtained. After the opening pressure of the pressure-limiting valve 18 has been exceeded, the pressure is limited to an adjustable maximum level, as is shown especially in FIG. 7 by a broken line.

Figure 8:
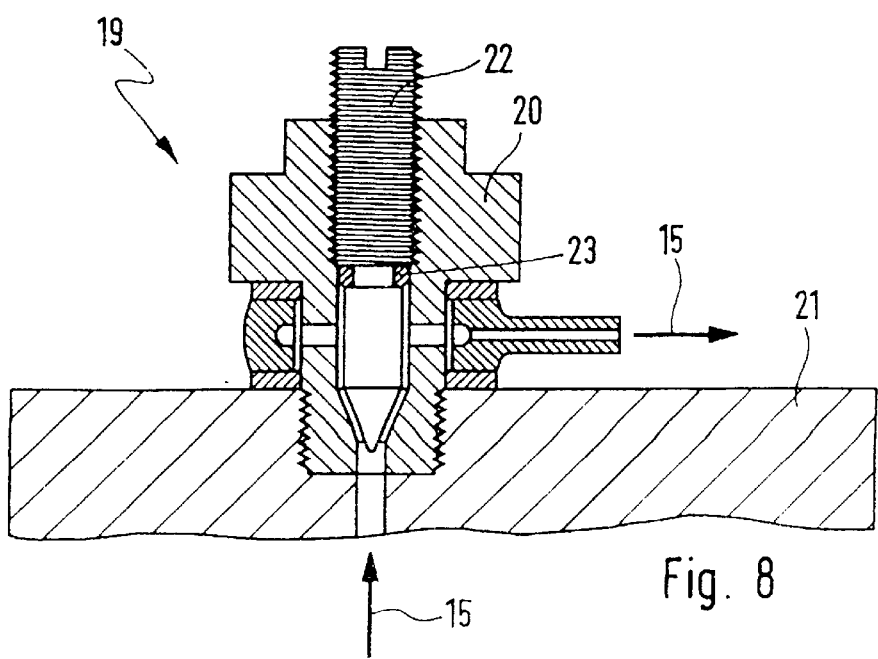
FIG. 8 is a schematic sectional view of a design of an adjustable throttle in a hollow screw in a burner housing hole.

In an especially advantageous embodiment of an adjustable throttle 19, the adjustable throttle is integrated according to FIG. 8 in a hollow screw 20, and the hollow screw 20 is in turn arranged in a hole of the burner housing 21. The hole is part of the fuel return 15. A conical final control element 22 sealed by an O-ring seal 23 is located in the hollow screw 20. As can be seen, the fuel characteristic can be shaped as a function of the speed by using an adjustable throttle in the return in conjunction with an adjustable pressure control valve, as it is shown especially by the characteristics K1', K2' and K3' in the top part of FIG. 5.

A heater is preferably always started up at the low output stage. Once the combustion takes place under stable conditions in the "low" setting, e.g., a water temperature signal is evaluated. If the water temperature T is below a defined value TG, the heater switches over to the "high" setting until a switchover criterion for the "low" setting is reached. If the water temperature T is above the above-mentioned defined value TG, the heater runs in the "low" setting until the switch-off criterion is reached.

For example, the following course of operation is obtained:
Start takes place in the "low" operating setting
Control criteria:
When the start has been concluded properly, a check is performed to determine whether the water temperature T at the control sensor≦limit temperature TG.
If T<TG→"high" operating setting
if T≧TG→"low" operating setting.
The heater is switched off (with slowdown)
if T≧TA, in which TA is the maximum temperature.
The heater is switched on again in the control operation
if T<TE, in which TE is the minimum temperature.

Since TE>TG is usually true, the "high" operating setting is needed during the heat-up process only. For keeping warm, the heater is normally operated in the "low" operating setting.

While specific embodiments of the invention have been shown and described in detail to illustrate the application of the principles of the invention, it will be understood that the invention may be embodied otherwise without departing from such principles.

What is claimed is:

1. An engine-independent vehicle heater with a pressure atomization burner having a combustion chamber, the heater comprising:
   an atomization nozzle;
   a fuel feed line;
   a fuel pump by which liquid fuel can be fed to said atomizing nozzle via said fuel line;
   a blower by which combustion air can be delivered into an interior of the combustion chamber;
   an electric motor, by which both said fuel pump and said blower are driven;
   an igniting device for igniting the fuel-air mixture in the interior of the combustion chamber;
   a voltage or speed control for controlling said electric motor, the control having a number of voltage or speed control stages;
   a pressure control for controlling fuel pressure in stages after the conclusion of the phase of ignition in the engine-independent motor vehicle heater, wherein said number of voltage or speed control stages of said electric motor is equal to the number of pressure control stages of said fuel pump, two output stages of said voltage or speed control and said pressure control are provided in the form of a low output stage and a high output stage;
   a fuel return wherein said pressure control includes two adjustable pressure-limiting valves with a downstream reversible solenoid valve in said fuel return, said valves being arranged in parallel to one another in said fuel line between said fuel pump and said atomizing nozzle.

2. The vehicle heater in accordance with claim 1, wherein said fuel return is connected on a suction side of said fuel pump to provide closed one-line system.

3. The vehicle heater in accordance with claim 1, wherein said fuel return extends to a fuel reserve, said pressure control includes a said third pressure-limiting valve in said fuel return opening toward said suction side of said fuel pump to provide an open two-line system.

4. An engine-independent vehicle heater with a pressure atomization burner having a combustion chamber, the heater comprising:
   an atomization nozzle;
   a fuel feed line;
   a fuel pump by which liquid fuel can be fed to said atomizing nozzle via said fuel line;
   a blower by which combustion air can be delivered into an interior of the combustion chamber;
   an electric motor, by which both said fuel pump and said blower are driven;
   an igniting device for igniting the fuel-air mixture in the interior of the combustion chamber;
   a voltage or speed control for controlling said electric motor, the control having a number of voltage or speed control stages;
   a pressure control for controlling fuel pressure in stages after the conclusion of the phase of ignition in the engine-independent motor vehicle heater, wherein said number of voltage or speed control stages of said electric motor is equal to the number of pressure control stages of said fuel pump, two output stages of said voltage or speed control and said pressure control are provided in the form of a low output stage and a high output stage, said pressure control includes an adjustable pressure-limiting valve and a downstream throttle in said fuel return, said pressure-limiting valve being provided in the said fuel line between said fuel pump and said atomizing nozzle.

5. The vehicle heater in accordance with claim 4, wherein said throttle is adjustable.

6. The vehicle heater in accordance with claim 4, wherein said fuel return is connected on said suction side of said fuel pump to form a closed one-line system.

7. The vehicle heater in accordance with claim 4, wherein said fuel return to said fuel reserve contains a another pressure-limiting valve opening toward said suction side of said fuel pump to form an open two-line operation system.

8. The vehicle heater in accordance with claim 5, wherein said adjustable throttle is integrated in a hollow screw, which is arranged in a burner housing hole of said fuel return.

9. Vehicle heater in accordance with claim 8, wherein said adjustable throttle has a conical final control element sealed by an o-ring seal in said fuel return.

10. The vehicle heater in accordance with claim 9, further comprising a pressure control includes a shut-off valve arranged upstream of said atomizing nozzle.

11. A vehicle heater in accordance with claim 10, wherein said shut-off valve is a solenoid valve.

12. An engine-independent vehicle heater with a pressure atomization burner having a combustion chamber, the heater comprising:
   an atomization nozzle;
   a fuel feed line;
   a fuel pump by which liquid fuel can be fed to said atomizing nozzle via said fuel line;
   a blower by which combustion air can be delivered into an interior of the combustion chamber;
   an electric motor, by which both said fuel pump and said blower are driven;
   an igniting device for igniting the fuel-air mixture in the interior of the combustion chamber;
   a voltage or speed control for controlling said electric motor, the control having a number of voltage or speed control stages;

a pressure control for controlling fuel pressure in stages after the conclusion of the phase of ignition in the engine-independent motor vehicle heater, wherein said number of voltage or speed control stages of said electric motor is equal to the number of pressure control stages of said fuel pump, two output stages of said voltage or speed control and said pressure control are provided in the form of a low output stage and a high output stage, said pressure control includes an adjustable pressure-limiting valve with an upstream throttle provided in said fuel line between said fuel pump and said atomizing nozzle.

13. An engine-independent vehicle heater with a pressure atomization burner having a combustion chamber, the heater comprising:

an atomization nozzle;

a fuel feed line;

a fuel pump by which liquid fuel can be fed to said atomizing nozzle via said fuel line;

a blower by which combustion air can be delivered into an interior of the combustion chamber;

an electric motor, by which both said fuel pump and said blower are driven;

an igniting device for igniting the fuel-air mixture in the interior of the combustion chamber;

a voltage or speed control for controlling said electric motor, the control having a number of voltage or speed control stages;

a pressure control for controlling fuel pressure in stages after the conclusion of the phase of ignition in the engine-independent motor vehicle heater, wherein said number of voltage or speed control stages of said electric motor is equal to the number of pressure control stages of said fuel pump, two output stages of said voltage or speed control and said pressure control are provided in the form of a low output stage and a high output stage, said pressure control includes a throttle and an adjustable pressure-limiting valve provided in parallel to one another in said fuel line between said fuel pump and said atomizing nozzle.

14. A process for controlling an engine-independent motor vehicle heater, the process comprising the steps of:

providing a burner with a pressure atomization nozzle;

feeding fuel to the burner at one of a high rate and a low rate;

feeding air to the burner at one of a high rate and a low rate;

igniting the fuel and air in the burner to initialize a flame;

stabilizing the flame;

measuring an actual temperature of the burner after said stabilizing of the flame;

comparing said actual temperature with a predetermined limit temperature;

feeding the fuel and air at said high rates when said actual temperature is below said limit temperature;

feeding the fuel and air at said low rates when said actual temperature is above said limit temperature;

providing a fuel line and a fuel return including two adjustable pressure-limiting valves with a downstream reversible solenoid valve in said fuel return, said valves being arranged in parallel to one another in said fuel line between said fuel pump and said atomizing nozzle, said feeding of the fuel controlling said valves.

* * * * *